United States Patent
Schwab et al.

(10) Patent No.: US 11,167,305 B2
(45) Date of Patent: Nov. 9, 2021

(54) METHOD AND PRODUCTION SYSTEM FOR PRODUCING VEHICLES, AND SURFACE TREATMENT SYSTEM FOR TREATING THE SURFACE OF VEHICLE BODIES

(71) Applicant: EISENMANN SE, Böblingen (DE)

(72) Inventors: Stephan Schwab, Waldenbuch (DE); Urs Gümbel, Nürtingen (DE)

(73) Assignee: EISENMANN SE, Böblingen (DE)

( * ) Notice: Subject to any disclaimer, the term of this patent is extended or adjusted under 35 U.S.C. 154(b) by 85 days.

(21) Appl. No.: 16/093,230

(22) PCT Filed: Apr. 6, 2017

(86) PCT No.: PCT/EP2017/058207
§ 371 (c)(1),
(2) Date: Oct. 12, 2018

(87) PCT Pub. No.: WO2017/178317
PCT Pub. Date: Oct. 19, 2017

(65) Prior Publication Data
US 2020/0114384 A1    Apr. 16, 2020

(51) Int. Cl.
*B05B 13/04* (2006.01)
*B05B 16/20* (2018.01)
(Continued)

(52) U.S. Cl.
CPC .......... *B05B 13/0452* (2013.01); *B05B 16/20* (2018.02); *B05B 13/0221* (2013.01);
(Continued)

(58) Field of Classification Search
CPC ............ B65G 49/02; B65G 2201/0294; B05B 13/0221; B05B 13/02; B05B 15/12;
(Continued)

(56) References Cited

U.S. PATENT DOCUMENTS 4,196,023 A * 4/1980 Rowe .................. B05C 3/10
118/304
4,988,537 A * 1/1991 Tanimoto ............ B05B 13/0221
427/379
(Continued)

FOREIGN PATENT DOCUMENTS

CN          103 097 232        5/2013
DE    10 2010 045 010        3/2012
(Continued)

OTHER PUBLICATIONS

Excerpt from Vieweg Handbuch Kraftfahrzeigtechnik, 6 pages.

*Primary Examiner* — James R Bidwell
(74) *Attorney, Agent, or Firm* — Schroeder Intellectual Property Law Group, LLC (57) ABSTRACT

A method for producing vehicles, wherein vehicle bodies are conveyed through multiple system zones of a production system in order to produce vehicles. Different types of work are carried out on the vehicle bodies in two respective system zones which follow each other. The vehicle bodies are conveyed through the system zones of the surface treatment system at least from a corrosion protection treatment to a final assembly using a single conveyor system in a surface treatment system for treating the surface of the vehicle bodies. A surface treatment system is provided for treating the surface of vehicle bodies, having multiple system zones, and the vehicle bodies are treated in a different manner in two respective system zones which follow each other. The surface treatment system is designed such that the vehicle bodies can be conveyed through the system zones of the system using a single conveyor system. A production system for producing vehicles using a surface treatment system is also provided, which is arranged between a corrosion protection system and a final assembly system, the (Continued)

production system including such a surface treatment system.

6 Claims, 5 Drawing Sheets

(51) Int. Cl.
*B05B 16/40* (2018.01)
*B05B 13/02* (2006.01)
*B62D 65/18* (2006.01)
*B65G 21/22* (2006.01)

(52) U.S. Cl.
CPC ......... *B05B 13/0431* (2013.01); *B05B 16/40* (2018.02); *B62D 65/18* (2013.01); *B65G 21/22* (2013.01); *B65G 2201/0294* (2013.01)

(58) Field of Classification Search
CPC ..... B05B 13/0452; B05B 16/40; B05B 16/20; B62D 65/18; B05D 1/18; B05D 7/14; B05C 3/10
USPC .......................................... 198/478.1, 465.4
See application file for complete search history.

(56) References Cited

U.S. PATENT DOCUMENTS

| | | | |
|---|---|---|---|
| 6,372,107 B1 * | 4/2002 | Besinger | B05C 3/10 204/479 |
| 6,659,262 B2 * | 12/2003 | Nishida | B65G 49/0459 198/346.3 |
| 6,902,051 B2 * | 6/2005 | Dehne | B65G 49/0459 198/346.3 |
| 6,966,431 B2 * | 11/2005 | Jaynes | B61B 10/02 198/465.4 |
| 7,097,024 B2 | 8/2006 | Swoboda | |
| 8,336,701 B2 | 12/2012 | Ruggaber et al. | |
| 8,474,594 B2 | 7/2013 | Robbin et al. | |
| 9,533,725 B2 * | 1/2017 | Bellezza | B23P 19/04 |
| 9,555,974 B2 | 1/2017 | Robbin et al. | |
| 9,688,478 B2 | 6/2017 | Robbin | |
| 10,359,234 B2 | 7/2019 | Robbin | |
| 11,029,089 B2 | 6/2021 | Hack | |
| 2001/0050046 A1 | 12/2001 | Nishida et al. | |
| 2003/0116179 A1 * | 6/2003 | Jarvis | B05C 3/10 134/95.3 |
| 2003/0150697 A1 | 8/2003 | Swoboda | |
| 2006/0180470 A1 | 8/2006 | Fage | |
| 2007/0116880 A1 * | 5/2007 | Anderson | C09D 5/084 427/372.2 |
| 2007/0245922 A1 | 10/2007 | Ueno et al. | |
| 2008/0251354 A1 | 10/2008 | Ruggaber et al. | |
| 2013/0075227 A1 | 3/2013 | Robbin et al. | |
| 2013/0199893 A1 | 8/2013 | Robbin | |
| 2013/0319822 A1 | 12/2013 | Robbin et al. | |
| 2014/0149549 A1 | 5/2014 | Fu | |
| 2018/0099681 A1 | 4/2018 | Riegraf et al. | |
| 2020/0011599 A1 | 1/2020 | Burkart | |
| 2020/0216130 A1 | 7/2020 | Von Krauland | |
| 2020/0271384 A1 | 8/2020 | Gumbel | |

FOREIGN PATENT DOCUMENTS

| | | |
|---|---|---|
| EP | 1 336 553 | 3/2005 |
| EP | 2 322 414 | 11/2012 |
| EP | 2 839 886 | 2/2015 |
| GB | 644 169 | 10/1950 |
| GB | 2 224 252 | 5/1990 |
| WO | 2004041628 | 5/2004 |
| WO | 2011/053681 | 5/2011 |

* cited by examiner

METHOD AND PRODUCTION SYSTEM FOR PRODUCING VEHICLES, AND SURFACE TREATMENT SYSTEM FOR TREATING THE SURFACE OF VEHICLE BODIES

RELATED APPLICATIONS

This application is a national phase of International Patent Application No. PCT/EP2017/058207 filed Apr. 6, 2017, which claims priority to German Patent Application No. 10 2016 004 484.5 filed Apr. 13, 2016, the contents of both of which are incorporated herein by reference.

FIELD OF THE INVENTION

The invention relates to a method for producing vehicles, in which vehicle bodies are conveyed through a plurality of facility zones of a production facility for producing vehicles, wherein different types of work are carried out on the vehicle bodies in each case two facility zones which follow one another.

Furthermore, the invention relates to a surface treatment facility for the surface treatment of vehicle bodies, having a plurality of facility zones, wherein the vehicle bodies are treatable in different ways in each case two facility zones which follow one another.

Moreover, the invention relates to a production facility for producing vehicles, having a surface treatment facility which is arranged between an anticorrosion facility and a final assembly facility.

BACKGROUND OF THE INVENTION

Once vehicle bodies have been put together from individual parts in a bodyshell facility and have been provided with corrosion protection in an anticorrosion facility, in particular by way of cataphoretic dip coating, they are subjected, before reaching a final assembly facility, to a surface treatment in a surface treatment facility, comprising as a whole a comparatively large number of individual treatment steps and generally starting with the drying of the cataphoretic dip coating. In the bodyshell facility, work is thus carried out on vehicle-body preliminary stages, namely the individual phases during the putting together of the vehicle body, while in the final assembly facility, work is thus carried out on vehicle-body final stages, namely the individual phases during the fitting of components and parts in and on the finished vehicle body. In the present document, both such vehicle-body preliminary stages and such vehicle-body final stages are covered by the term vehicle body. With regard to the bodyshell construction, it is thus possible for the first sheet-metal part and all intermediate superstructures right up to the finished vehicle body to be understood as the vehicle body.

Consequently, a facility for producing vehicle bodies comprises various facility zones which have to be passed through by the vehicle bodies in a particular order and in which work of different types is carried out on the vehicle bodies. Such work includes both measures in which operations are actively carried out on the vehicle body or the latter is modified or added to, for example during the putting together of individual parts in bodyshell construction or final assembly, during application of material or the drying of the vehicle bodies, and measures in which operations are not carried out actively on the vehicle body, for example an audit or flashing-off of the vehicle body. In the surface treatment facility, the vehicle bodies are treated in different ways in the different facility zones as part of such work.

In all work zones, there are work installations with or in which the corresponding work is carried out. In the surface treatment facility, such work installations are accordingly in the form of treatment installations.

In a bodyshell facility, different types of fastening of sheet-metal parts together, for example, are carried out in different facility zones.

In cataphoretic dip coating for corrosion protection in the anticorrosion facility, only one facility zone can be present. However, depending on techniques which are chosen for applying corrosion protection and are not dip coating or not just dip coating, it is also possible for several zones to be present.

The different facility zones in the surface treatment facility can be subdivided in the main into application zones, tempering zones and functional zones, wherein, in the individual facility zones of the surface treatment facility, one or more treatment installations can be arranged.

In the application zones, the vehicle bodies are provided with a coating or a material. For example, these include the application of filler, base coat or top coat, or the application of material for underbody protection or of material for seam sealing.

In the tempering zones, the vehicle bodies are tempered. "Tempering" of a vehicle body means that a particular temperature of the vehicle body is brought about that the latter does not initially have. It can be an increase in temperature or a reduction in temperature. The flashing-off of a vehicle body also counts in the present document as a treatment as part of "tempering".

In the functional zones, measures are taken which support the overall process and the overall sequence. These include for example the carrying out of audits and optionally the reworking of surface regions of the vehicle body which do not meet the demanded quality standard. Another functional zone forms, for example, a storage zone in which vehicle bodies can be temporarily stored and/or kept available.

A final assembly facility is intended here to define in principle only a single facility zone, since the installation and assembly measures taken therein count as work of one type.

In commercially known production facilities for producing vehicles, and in particular in surface treatment facilities that belong to such facilities, the vehicle bodies are conveyed through different facility zones with different conveying systems that are suited to the respective facility zones and work or treatment installations present therein, since the different types of work and treatment require different conveying systems in known facilities. It is even possible for different conveying systems to have to be used in two successive work or treatment installations of one and the same facility zone. Known different conveying systems of this type, which are used in the different facility zones and/or work or treatment installations, are for example carrying chain conveyors, roller conveyors with or without transfer carriages and turntables, and overhead conveyors. In this case, the vehicle bodies can be temporarily fastened to what are known as skids, as are known per se. Optionally, it is actually possible for one and the same conveying system to be able to be used in two different successive facility zones, at least in the last work or treatment installation of a first facility zone and the first work or treatment installation of a following second facility zone.

In each case, between two different conveying systems, the vehicle body is transferred from one conveying system to the other conveying system in a transfer region. Optionally, the vehicle body is fastened to a skid at the time or is removed from a skid or transferred from a skid of a first type to a skid of a second type.

The use of different conveying systems with or without skids is very structurally complicated. Moreover, each transfer from one conveying system to the next requires a corresponding expenditure of time, and so the possible total throughput of the surface treatment facility is reduced.

SUMMARY OF THE INVENTION

It is the object of the invention to provide a method, a surface treatment facility and a production facility of the type mentioned at the beginning, which take account of these considerations.

In a method of the type mentioned at the beginning, this object is achieved in that the vehicle bodies are conveyed through the facility zones of a surface treatment facility for the surface treatment of the vehicle bodies, at least from an anticorrosion treatment to final assembly in the surface treatment facility, with one and the same conveying system.

According to the invention, it has been recognized that it is possible, at least in a surface treatment facility, to achieve harmonization of the facility zones and a conveying system, resulting in a single conveying system suitable for all facility zones of the surface treatment facility. As a result, no transfers from a first conveying system to a second conveying system, which is different than the first conveying system, are necessary any longer, and so the overall sequence of the surface treatment can be carried out more effectively, with less structural complexity and thus in a time-saving and cost-effective manner.

It is particularly effective when the vehicle bodies are conveyed in an anticorrosion facility with the same conveying system as in the surface treatment facility.

Preferably, vehicle bodies are also conveyed in a bodyshell facility with the same conveying system as in the surface treatment facility.

Particularly advantageously, vehicle bodies are additionally conveyed in an assembly facility with the same conveying system as in the surface treatment facility.

In a departure from known facilities, a production facility is thus operated in which a conveying technique has been developed which allows harmonization with the work and treatment techniques, such that, in the individual facilities of a facility for producing vehicles, or at least in any case in the surface treatment facility thereof, one and the same conveying system can be used. Even if for example the cataphoretic dip coating in the anticorrosion facility has to be kept, one and the same conveying system can be provided at least in the surface treatment facility or additionally in one or in several or in all of the remaining facilities apart from the anticorrosion facility. Even if one and the same conveying system can be used for example in the bodyshell facility and in the surface treatment facility but not in the anticorrosion facility, a considerable advantage is achieved, since the conveying systems in bodyshell construction and surface treatment do not have to be designed differently.

It is particularly favorable when a conveying system is used which comprises a multiplicity of transport carriages which are displaceable in a transporting direction on a rail system, wherein each transport carriage comprises a transport-carriage chassis and a fastening device for at least one vehicle body, which are coupled together by means of a connecting device.

A conveying system of this type can be used particularly readily when the vehicle bodies are treated in at least one facility zone in at least one treatment installation which comprises a housing in which a treatment tunnel having a tunnel floor is accommodated, wherein the tunnel floor has a connecting passage and there is a travel space, arranged beneath the treatment tunnel, for the transport carriage chassis, such that the transport carriage chassis is movable in the travel space, wherein the fastening device is carried along in the treatment tunnel and the connecting device extends through the connecting passage. This separates the treatment region from the conveying region.

Advantageously, transport carriages are used which each carry along their own drive system and are driven and displaced independently of one another. In this way, the vehicle bodies can be guided individually through the facility zones. Thus, vehicle bodies can optionally also be conveyed through the facility on different conveying paths, but in any case be moved easily into storage or temporary storage zones, this not being readily possible with a central drive system, since, to this end, the transport carriages have to be uncoupled from a first drive system for a first path and coupled to a second drive system for a second path.

In a surface treatment facility of the type mentioned at the beginning, the abovementioned object is achieved in that the facility is set up such that the vehicle bodies are able to be conveyed through the facility zones of the facility with one and the same conveying system.

The resultant advantages correspond to the advantages explained above with regard to the method.

Preferably, the conveying system comprises a multiplicity of transport carriages which are displaceable in a transporting direction on a rail system, wherein each transport carriage comprises a transport-carriage chassis and a fastening device for at least one vehicle body, which are coupled together by means of a connecting device.

Such a conveying system can be used particularly readily in a facility in which at least one facility zone comprises at least one treatment installation in which the vehicle bodies are treated and which comprises a housing in which a treatment tunnel having a tunnel floor is accommodated, wherein the tunnel floor has a connecting passage and there is a travel space, arranged beneath the treatment tunnel, for the transport-carriage chassis, such that the transport-carriage chassis is movable in the travel space, wherein the fastening device is carried along in the treatment tunnel and the connecting device extends through the connecting passage.

In this case, it is advantageous when shielding means are provided, by which contact of at least the transport-carriage chassis with the tunnel atmosphere through the connecting passage is at least reduced. In this way, contamination of the conveying system and in particular of the transport carriages by the tunnel atmosphere or by substances which are present in the tunnel atmosphere is effectively prevented.

When the transport-carriage chassis comprises a leading unit running ahead in the transport direction and a trailing unit running behind in the transport direction, the system can be designed so as to be able to negotiate curves, if the coupling points are formed by corresponding rotary couplings.

With the ability of the transport carriages to negotiate curves in mind, it may be advantageous when the connecting device comprises at least two vertical joint struts which couple the leading unit and the trailing unit to the fastening device.

For the individual treatment of a vehicle body, it is favorable when the transport carriages each carry along their own drive system, such that the transport carriages are drivable and displaceable independently of one another.

Preferably, the drive system comprises at least one drive roller which is supported by the transport-carriage chassis and is able to roll on a drive running surface of the rail system, and at least one drive motor for the at least one drive roller, said drive motor being carried along by the transport-carriage chassis.

It is particularly advantageous when at least one of the transport carriages carries along a dedicated energy supply device, by means of which the at least one drive motor of the transport carriage is able to be supplied with energy. In this way, it is possible to dispense with an installation for energy supply along the rail system. Any disruption to the energy supply of a transport carriage is then always limited to the transport carriage itself, and so such a defective transport carriage or the energy-supply components thereof can be replaced without other transport carriages being affected or work on the rail system being necessary. If disruptions to the energy supply occur when the transport carriage is outside the dryer, the transport carriage can be maintained in isolation from the transport path and the further transport carriages, without the conveying system being impaired.

In this case, it is particularly favorable when the dedicated energy supply device comprises at least one rechargeable energy store. In particular rechargeable batteries or capacitors are suitable for this purpose.

In a production facility of the type mentioned at the beginning, this abovementioned object is achieved in that the surface treatment facility is a surface treatment facility having some or all of the abovementioned features. The advantages thereof correspond to the advantages which were explained in conjunction with the method and the surface treatment facility.

In a corresponding manner, it is favorable when the same conveying system for the vehicle bodies is present in the anticorrosion facility as in the surface treatment facility.

The same conveying system for the vehicle bodies is preferably also present in the final assembly facility as in the surface treatment facility.

Furthermore, the production facility preferably comprises a bodyshell facility, in which the same conveying system for vehicle bodies as in the surface treatment facility is present.

BRIEF DESCRIPTION OF THE DRAWING

Exemplary embodiments of the invention are explained in more detail in the following text with reference to the drawings, in which.

DETAILED DESCRIPTION OF THE INVENTION

Figure 1:
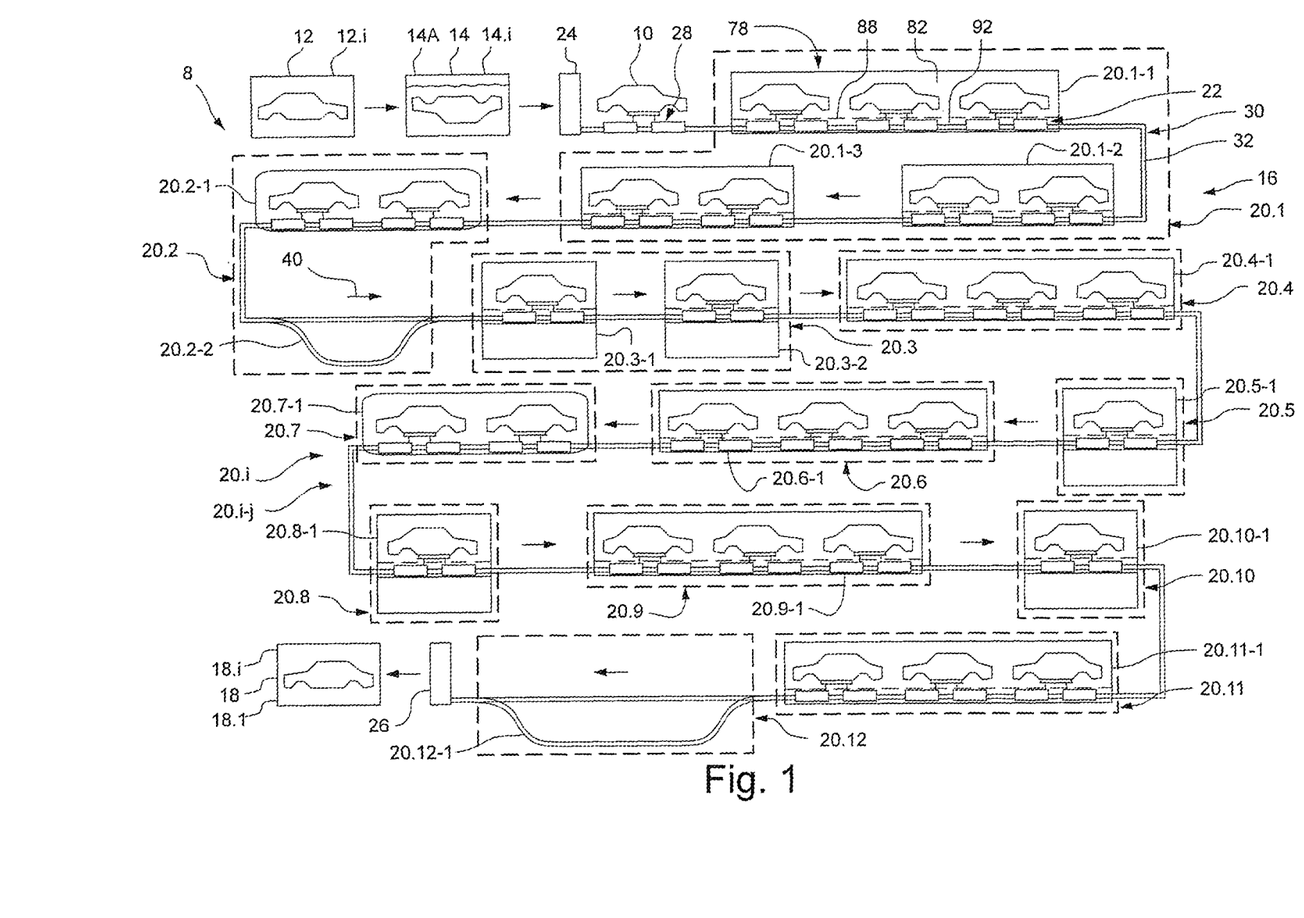
FIG. 1 schematically shows a surface treatment facility for vehicle bodies, having a plurality of facility zones of different functionality, in which the vehicle bodies are treated in different ways.

FIG. 1 schematically illustrates a production facility 8 for producing vehicle bodies 10, which for its part comprises individual facilities 12, 14, 16 and 18. After a bodyshell facility 12, the vehicle bodies 10 pass into an anticorrosion facility 14 and subsequently pass through a surface treatment facility 16. Then, the vehicle bodies 10 enter a final assembly facility 18, in which the roadworthy motor vehicles are assembled. Of the vehicle bodies 10, only one bears a reference sign for the sake of clarity.

The facilities 12, 14, 16 and 18 can comprise different, successive facility zones, of which different zones of the bodyshell facility 12, of the anticorrosion facility 14 and of the assembly facility 18 are indicated by the reference signs of each particular facility plus the index ".i", i.e. by 12.*i*, 14.*i* and 18.*i*, respectively. Only the different zones of the surface treatment facility 16 bear a separate reference sign 20.*i*. The index ".i" is intended to indicate that in each case i=1 to n facility zones can be present, wherein n indicates in each case the total number of facility zones 12.*i*, 14.*i*, 18.*i* and 20.*i*, respectively, in which the vehicle bodies 10 are treated in different ways. If only one zone is present, n is consequently equal to 1 in each case. This is the case, as was mentioned above, for example in the case of the final assembly facility 18, in which there is only one facility zone 18.1. When two successive zones are present, these bear the indices "i" and "i+1".

In the bodyshell facility 12, sheet metal parts manufactured in a pressing plant are put together to form the vehicle bodies 10. This can take place in different bodyshell facility zones 12.*i* using different known techniques. By way of example, spot welding, path welding, clinching, riveting and adhesive bonding are mentioned. Thus, work is carried out on a vehicle body 10, here.

In the anticorrosion facility 14, the vehicle bodies 10 are given an anticorrosion treatment. The anticorrosion facility 14 comprises individual anticorrosion-facility zones 14.*i* and can be in the form of a facility, known per se, for cataphoretic dip coating. This is the case in the present exemplary embodiment, as is indicated schematically in FIG. 1 by a CDC dipping bath 14A. However, it is also possible for other anticorrosion treatments to take place, for example application of corrosion protection by spraying or the like.

In the assembly facility 18, the vehicle bodies 10 are fitted with the components and parts necessary for a roadworthy vehicle.

The surface treatment facility 16 shown in more detail now comprises a plurality of different facility zones 20.*i*, in which the vehicle bodies 10 are treated in different ways and which optionally comprise several treatment installations 20.*i*-*j*. Different facility zones 20.*i* are framed by dashed lines.

Different, successive facility zones 20.*i* thus each bear the reference sign 20 with a consecutive numerical index ".i", i.e. 20.1, 20.2, 20.3, etc. Treatment installations which are encompassed by a facility zone 20.*i* bear the reference sign of the facility zone 20.$i$ plus a numerical index "-$j$". When there is only one treatment installation in a facility zone 20.$i$, said treatment installation therefore bears the reference numeral 20.$i$-1, and in the case of several treatment installations in a facility zone 20.$i$, there are accordingly treatment installations 20.$i$-1, 20.$i$-2, etc.

In the other facilities 12, 14 and 18 and the associated facility zones 12.$i$, 14.$i$ and 18.$i$, work installations or treatment installations are present which are not shown separately or provided with reference signs in the present case.

The vehicle bodies 10 are treated in different ways in the surface treatment facility 16 in each case two facility zones 20.$i$ and 20.$i$+1 which follow one another. This means that, in the sequence of the facility zones 20.$i$, several facility zones 20.$i$ in which the vehicle bodies 10 are treated in the same way are necessarily present. The boundary between two adjacent facility zones 20.$i$ and 20.$i$+1 is defined in the present case in that the type of treatment changes. Within the meaning of the classification explained above, a change in the type of treatment occurs at the transition between application zones, tempering zones and functional zones.

In the present exemplary embodiment, the surface treatment facility 16 comprises by way of example the following facility zones 20.$i$ with the associated treatment installations 20.$i$-$j$:

20.1 First tempering zone
   20.1-1 CDC dryer
   20.1-2 CDC cooling device
   20.1-3 CDC flash-off device
20.2 First functional zone
   20.2-1 Auditing/polishing device
   20.2-2 Storage device
20.3 First application zone
   20.3-1 Underbody-protection application device
   20.3-2 Seam-sealing application device
20.4 Second tempering zone
   20.4-1 PVC dryer
20.5 Second application zone
   20.5-1 Filler application device
20.6 Third tempering zone
   20.6-1 Filler dryer
20.7 Second functional zone
   20.7-1 Auditing/polishing device
20.8 Third application zone
   20.8-1 Base-coat (BC) coating device
20.9 Fourth tempering zone
   20.9-1 BC dryer
20.10 Fourth application zone
   20.10-1 Top-coat (CC) coating device
20.11 Fifth tempering zone
   20.11-1 CC dryer
20.12 Third functional zone
   20.12-1 Store The surface treatment facility 16 is set up such that the vehicle bodies 10 can be conveyed through the facility zones 20.$i$, i.e. 20.1, 20.2, . . . , 20.$n$, with one and the same conveying system 22, wherein n specifies the number of facility zones present. In the present exemplary embodiment, n=12. To this end, the conveying system 22 and the treatment installations 20.$i$-$j$ are coordinated with one another, as will become clear further below.

Located between the dipping bath 14A of the anticorrosion facility 14 and the first tempering zone 20.1 is a transfer device 24, by means of which a vehicle body 10 to be treated can be transferred from the conveying system of the anticorrosion facility 14 to the conveying system 22 of the surface treatment facility 16. In a corresponding manner, a transfer device 26, by means of which a treated vehicle body 10 can be transferred from the conveying system 22 of the surface treatment facility 16 to the conveying system of the final assembly facility 18, is located between the third functional zone 20.12, i.e. the last facility zone of the surface treatment facility 16, and the final assembly facility 18.

When the conveying system in the anticorrosion facility 14 and/or the final assembly facility 18 is the same conveying system 22 as in the surface treatment facility 16, the transfer device 24 and/or the transfer device 26 is/are not present. If the same conveying system is not used in the bodyshell facility 12 as in the anticorrosion facility 14, as is the case when a CDC dipping bath 14A is present, a transfer device that is not shown separately here is present between these two facilities.

The transport system 2 comprises a multiplicity of transport carriages 28, on which the vehicle bodies 10 are transported and which are displaced on a rail system 30, wherein, in FIG. 1, only one transport carriage 28 bears its reference sign.

Figure 2:
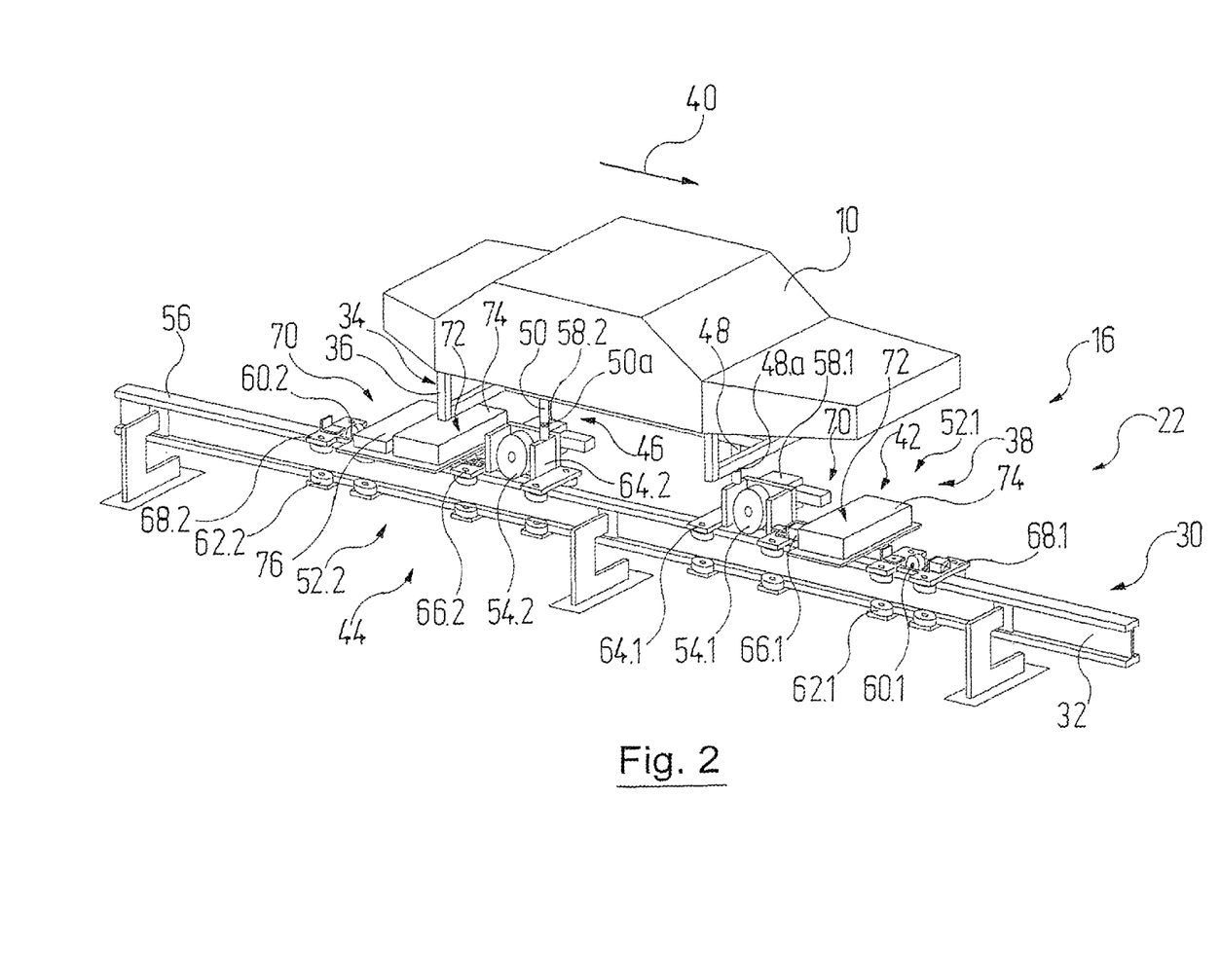
FIG. 2 shows a perspective view of a transport system for vehicle bodies, wherein a support rail of a rail system with a transport carriage that is displaceable thereon is shown, said transport carriage comprising a transport-carriage chassis which is connected via a connecting device to a fastening device for workpieces.

FIG. 2 now shows an individual transport carriage 28 on the rail system 30. The latter comprises a support rail 32, on which the transport carriage 28 travels and which is configured in a manner known per se as an I-profile and is anchored to the ground. The support rail 32 thus secured to the ground is a single-track support rail. Alternatively, it is also possible for a multi-track, in particular two-track rail system 30 to be present.

The transport carriage 28 comprises a fastening device 34, to which a vehicle body 10 can be fastened. For this purpose, the fastening device 34 comprises a support profile 36 with bearing bolts (not visible in the figures) which cooperate in a manner known per se with counterpart elements on the vehicle body 10, such that the vehicle body 10 can be fixed to the fastening device 34. The fastening device 34 can also have several sets of such bearing bolts, which are adapted to different vehicle bodies 10 with different dimensions and configurations, such that the fastening device 34 can be used flexibly for different vehicle body types.

The fastening device 34 thus directly receives a vehicle body 10 without the vehicle body 10 being fastened to a workpiece carrier, for example a skid that is known per se.

The transport carriage 28 comprises a transport-carriage chassis 38, which runs on the support rail 32 and supports the fastening device 34. In the present exemplary embodiment, the transport-carriage chassis 38 comprises a leading unit 42 running ahead in the transport direction 40 and a trailing unit 44 running behind in the transport direction 40. The transport direction 40 is indicated by corresponding arrows in FIG. 1, of which only one bears a reference sign.

The leading unit 42 and the trailing unit 44, i.e. generally the transport-carriage chassis 38, are coupled to the fastening device 34 via a connecting device 46. The coupling is set up such that the transport carriage 28 is capable of also passing through curved sections of the support rail 32. In the present exemplary embodiment, the connecting device 46 comprises two vertical joint struts 48 and 50, respectively, which couple the leading unit 42 and the trailing unit 44 to the fastening device 34. The joint struts 48, 50 make it possible, by way of a joint 48$a$ and 50$a$, respectively, for the fastening device 34 to be able to pivot about a vertical axis of rotation with respect to the leading unit 42 and the trailing unit 44.

Furthermore, the transport carriage 28 is set up such that it can also overcome inclined sections, i.e., as seen in the transport direction 40, ascending sections or descending sections, of the support rail 32. To this end, the support profile 36 is also fastened to the joint struts 48, 50 so as to be pivotable in each case about a horizontal pivot axis.

The leading unit 42 and the trailing unit 44 are of largely identical construction, wherein individual parts and components are positioned in a mirror-inverted manner on a straight section of the support rail 32 with respect to a plane perpendicular to the transport direction 40. Mutually corresponding parts and components of the leading unit 42 and the trailing unit 44 bear the same reference signs with the indices "0.1" and "0.2", respectively. The leading unit 42 forms a chassis unit 52.1 and the trailing unit 44 forms a chassis unit 52.2 of the transport-carriage chassis 38 of the transport carriage 28.

In the following text, the leading unit 42 will now be explained; what is stated in this regard applies, mutatis mutandis, to the trailing unit 44. The leading unit 42 supports a drive roller 54.1, which rolls on a drive running surface 56 of the support rail 32 and is driven by means of a drive motor 58.1, which is carried along by the leading unit 42. In the present exemplary embodiment, the drive running surface 56 of the support rail 32 is the surface on the top side of the I-profile and, in horizontal sections of the support rail 32, accordingly extends likewise in a horizontal manner. In the case of modifications that are not shown separately, the drive running surface 56 can also extend for example vertically; in this case, the drive roller 54.1 presses laterally, as a friction wheel, against the support rail 32.

In general terms, the transport carriages 28 each carry along a separate drive system, such that the transport carriages 28 can be driven and displaced independently of one another. In the present exemplary embodiment, the separate drive system is formed by the drive rollers 54.1, 54.2 the associated drive motors 58.1, 58.2.

In addition to or instead of the transport carriages 28, explained here, with their own drive system, it is also possible optionally for other transport carriages to be present which are driven by a central drive system. For example, such a central drive system can be formed by a chain hoist or the like. The transport carriages 28 explained here can accordingly also be driven and displaced independently of other drive devices.

In order to prevent the leading unit 42 from tipping in the transport direction 40, i.e. about a horizontal axis perpendicular to the transport direction 40, the chassis unit 52.1 of the leading unit 42 bears, at a distance from the drive roller 54.1, a passive supporting roller 60.1, which likewise rolls on the drive running surface 56 of the support rail 32. Furthermore, the chassis unit 52.1 of the leading unit 42 supports several lateral guide rollers 62.1, of which only two bear a reference sign and which bear against the support rail 32 from both sides, thereby preventing tipping of the leading unit 42 to the side in a manner known per se.

In the present exemplary embodiment, the leading unit 42 comprises a drive frame 64.1, which supports the drive roller 54.1 with the drive motor 58.1 and, on both sides of the support rail 32, in each case four guide rollers 62.1. The drive frame 64.1 is connected to a supporting frame 68.1 in an articulated manner via a supporting crossmember 66.1, said supporting frame 68.1 for its part supporting the supporting roller 60.1 and likewise, on both sides of the support rail 32, in each case four guide rollers 62.1. The articulated connection of the drive frame 64.1 to the supporting frame 68.1 takes place via coupling joints (not separately provided with a reference sign), which allow curved sections of the support rail 32 to be passed through.

In the present exemplary embodiment, both the leading unit 42 and the trailing unit 44 each support a drive roller 54.1 and 54.2, respectively, and the respectively associated drive motor 58.1, 58.2. In a modification that is not shown separately, it may be sufficient for a drive roller 54.1 having a drive motor 58.1 to be present only on the leading unit 42. The transport-carriage chassis 38 of the transport carriage 28 in any case supports at least one drive roller and carries along the drive motor thereof.

For the energy supply of the drive motors 58.1 and 58.2 of the leading unit 42 and of the trailing unit 44, the transport carriage 28 carries along a dedicated energy supply device 70. This should be understood as being an energy supply device which ensures the energy supply of the drive motors 58.1, 58.2 during driving operation, i.e. during the movement of the transport carriage 28, independently of external energy sources.

In the present exemplary embodiment, the energy supply device 70 is designed with rechargeable energy stores 72 with at least one energy storage unit 74. In this case, an energy storage unit 74 for the respective drive motor 58.1, 58.2 is present on each chassis unit 52.1, 52.2. A rechargeable energy storage unit 74 for electrical energy can be provided in the form of a rechargeable battery or of a capacitor. In a modification that is not shown separately, it is also possible for only one energy storage unit for both drive motors 58.1, 58.2 to be provided. Alternatively, compressed-gas storage means can also be present as energy source for compressed-gas drives.

In principle, the transport carriages 28 can also be supplied with energy with the aid of supply systems that are known per se. These include in particular a configuration in which the support rail 32 comprises a current-carrying conductor line, wherein the transport carriages 28 then carry along corresponding take-up means which come into conducting contact with the conductor line. Known contactless energy transmission devices can also be used.

The trailing unit 46 furthermore bears a control device 76, by means of which the drive motors 58.1, 58.2 are controlled and synchronized. The control device 76 communicates with a central controller (not shown separately) of the surface treatment facility 16.

Figure 3:
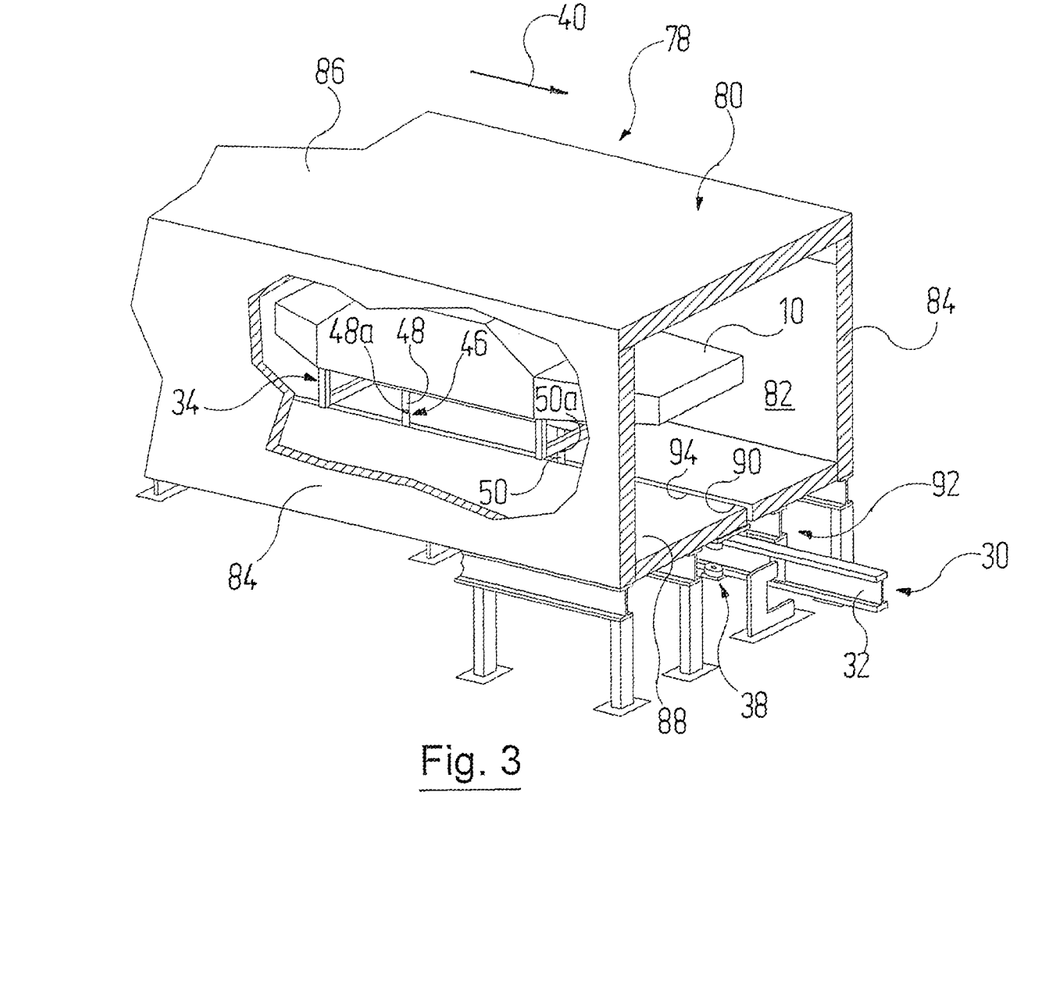
FIG. 3 shows a perspective view of a portion of a treatment installation of a facility zone having the transport system according to FIG. 2, wherein a treatment tunnel is shown, the tunnel floor of which has a connecting passage complementary to the connecting device, said connecting passage leading to a travel space for the transport-carriage chassis, wherein the fastening device is arranged in the treatment tunnel and the transport-carriage chassis is arranged in the travel space.

FIG. 3 illustrates the basic concept of a work installation or treatment installation in the facilities 12, 14, 16, 18 and shows in particular a treatment installation 20.*i-j*, as can be provided in one of the tempering zones 20.1, 20.4, 20.6, 20.9, 20.11 or in one of the application zones 20.3, 20.5, 20.8, 20.10, on the basis of a treatment installation 78. The treatment installation 78 is thus an example of the treatment installations 20.*i-j* present in the present exemplary embodiment and the work and treatment installations (not shown separately) of the remaining facilities 12, 14 and 18.

The respective components, explained in the following text, of the treatment installation 78 merely reflect the basic functionality of the component. Thus, for example, the housing of a dryer is formed differently, in a known manner, than for example the housing of a coating booth.

The treatment installation 78 comprises a housing 80, which bounds a treatment tunnel 82, and comprises side walls 84, a top 86 and a tunnel floor 88. The tunnel floor 88 has a connecting passage 90, complementary to the connecting device 46 of the transport carriages 28, said connecting passage leading to a travel space 92, arranged beneath the drying tunnel 82, for the transport-carriage chassis 38, in which the rail system 30 is accommodated.

In FIG. 1, the tunnel floors in the treatment installations 20.*i-j*, which are constructed functionally like the treatment installation 78, are illustrated in each case by a dashed line; for the sake of clarity, it is only in the CDC dryer 20.1-1 that only the treatment installation 78, the treatment tunnel 82, the tunnel floor 88 and the travel space 92 are provided with reference signs. In the auditing/polishing devices 20.2-1 and 20.7-1, for example no separation of a travel space and of a treatment tunnel by a tunnel floor is shown. It is always possible to dispense therewith when there is no risk of the components and parts of the conveying system 22 being affected during the treatment.

The travel space 92 can be open toward the environment of the treatment installation 78; in any case, it is not necessary for a separate housing for the travel space 92 to be present. In a modification that is not shown separately, the travel space 92 is bounded by a separate housing. Alternatively, the side walls 84 of the housing 80 can also extend downward beyond the tunnel floor 88, such that they laterally bound the travel space 92.

When a transport carriage 28 laden with a vehicle body 10 travels into a treatment installation 78, the connecting device 46 of the transport carriage 28 is thus as it were threaded into the connecting passage 90 of the tunnel floor 88. When the vehicle bodies 10 are then conveyed through the treatment tunnel 82, the transport-carriage chassis 38 moves in the travel space and carries along the fastening device 34 in the treatment tunnel 82, wherein the connecting device 46, i.e. the joint struts 48 and 50 in the present exemplary embodiment, extends through the connecting passage 90 in the tunnel floor 88.

Figure 4:
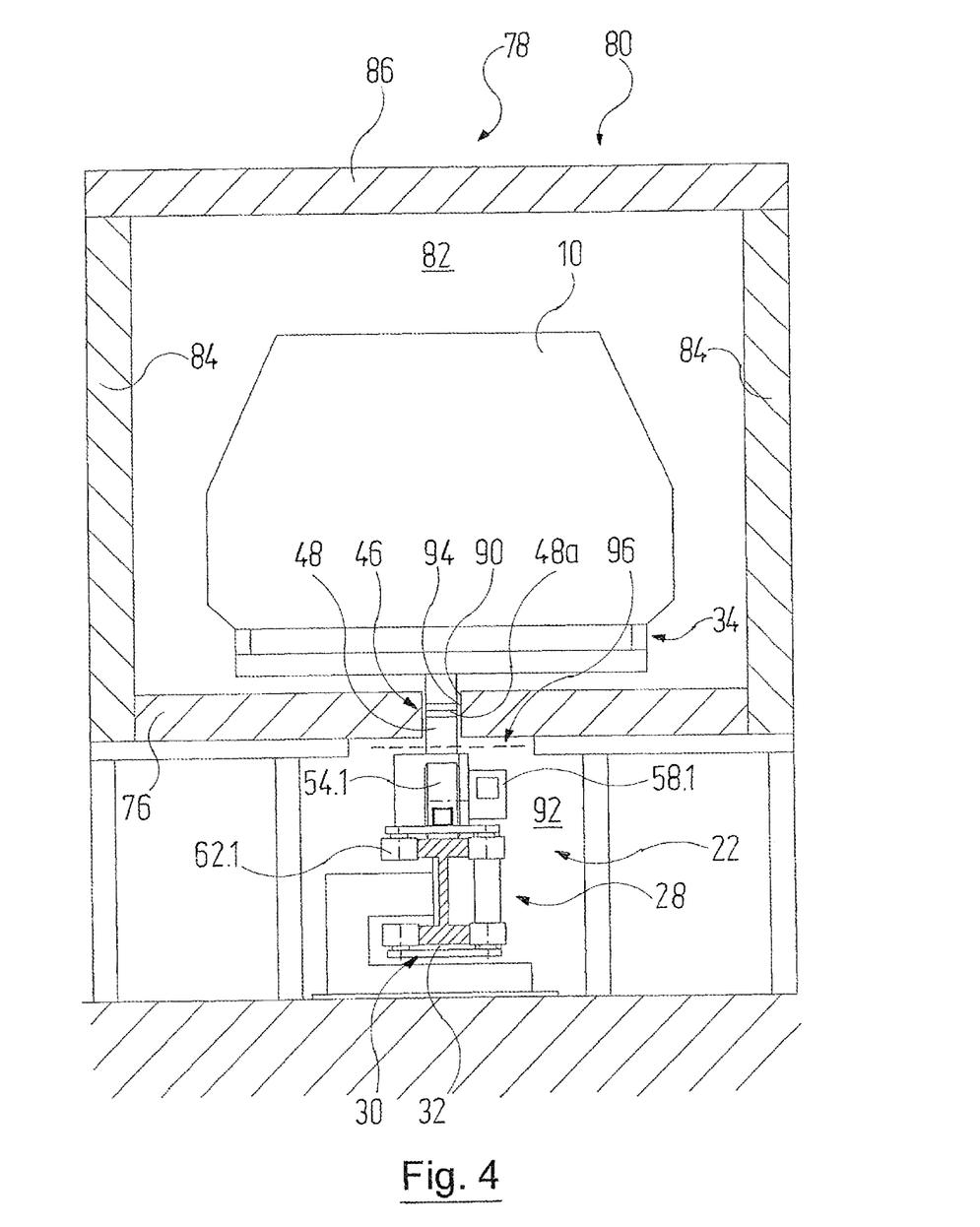
FIG. 4 shows a cross section of the treatment tunnel according to FIG. 3, wherein shielding means with respect to the travel space are indicated.

As can be seen in FIGS. 3 and 4, the connecting passage 90 in the present exemplary embodiment is formed as a vertical passage slot 94 in a manner matching the vertically extending joint struts 48, 50. In this case, with appropriate flow conditions, the tunnel atmosphere could flow down from the treatment tunnel 82 into the travel space 92 through the connecting passage 90 in a largely unimpeded manner without countermeasures.

In a dryer, the tunnel atmosphere is contaminated with solvent. In a coating device, the tunnel atmosphere carries along in particular coating overspray, which could then settle on the transport-carriage chassis 38.

In order to prevent such flowing of the tunnel atmosphere out of the treatment tunnel 82, shielding means 96 are additionally provided, by way of which contact at least of the transport-carriage chassis 38 with the tunnel atmosphere through the connecting passage 90 is at least reduced. Likewise, any flow of atmosphere out of the travel space 92 into the treatment tunnel 82 can be reduced in order to maintain a stable atmosphere in the treatment tunnel 82. In FIG. 4, the shielding means 92 are indicated only schematically; FIGS. 5A to 5F show different exemplary embodiments of shielding means 96.

Figure 5:
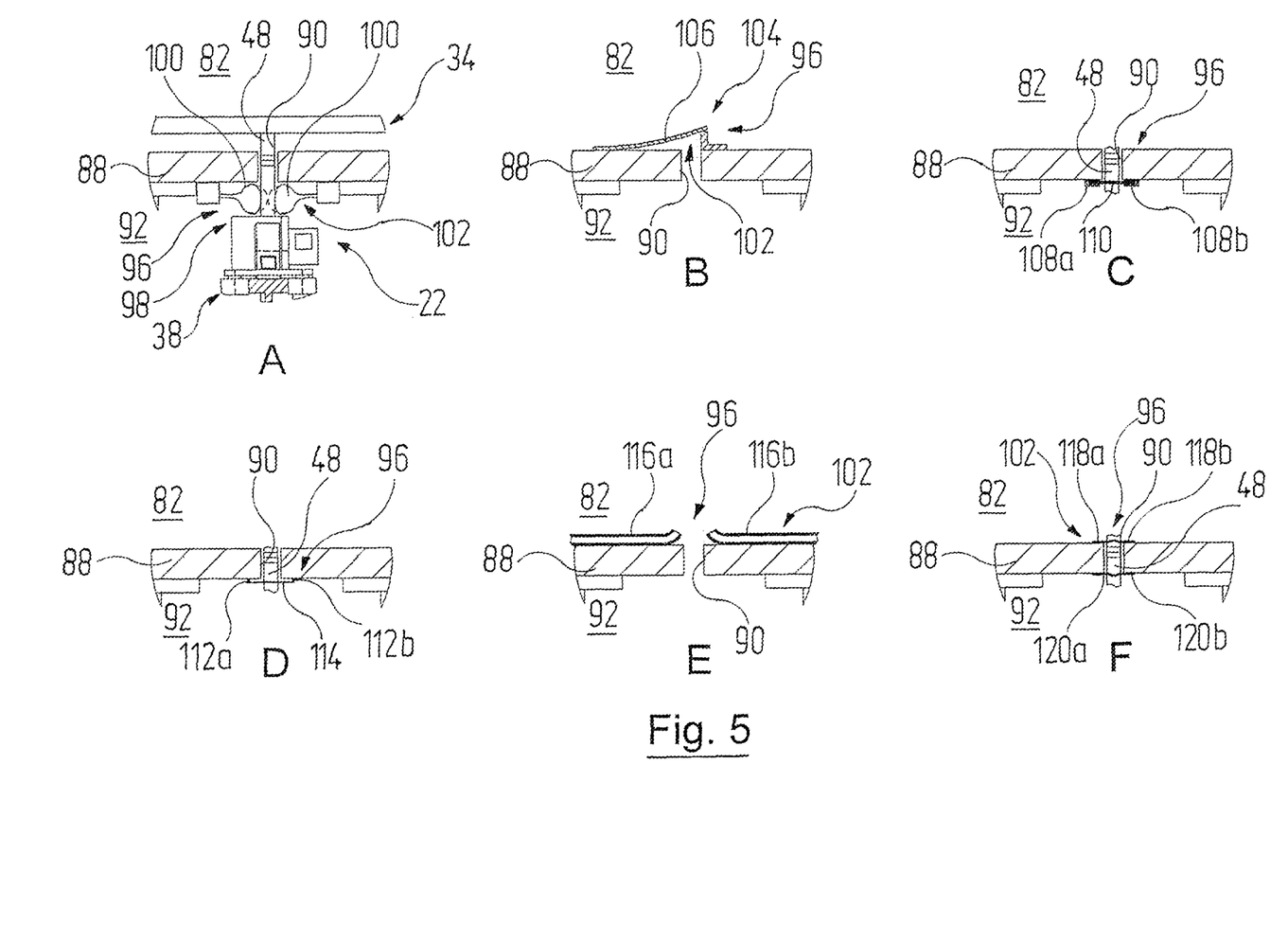
FIGS. 5A to 5F of FIG. 5A show detail sections with different shielding means.

FIG. 5A illustrates shielding means 96 in the form of a gasket seal 98, in the case of which two sealing beads 100 are located opposite one another in the longitudinal direction of the treatment tunnel 82. In the relaxed state, which is indicated by dashed lines, the sealing beads 100 rest against one another such that the connecting passage 90 is covered at the tunnel floor 88. When the transport carriage 28 travels into the travel space 92 of the treatment installation 78, the joint struts 48, 50 pass between the sealing beads 100, which are pushed apart as a result and surround the joint struts 48, 50 in a sealing manner. The shielding means 96 thus form a sealing device 102.

FIG. 5B shows shielding means 96 in the form of an imbricated seal 104, in the case of which a multiplicity of sealing lamellae 106 are arranged in an overlapping manner in the longitudinal direction of the treatment tunnel 82 such that they cover the connecting passage 90 at the tunnel floor 88. The sealing lamellae 106 are in practice produced from a flexible metal sheet or an, optionally temperature-resistant, flexible plastic. When the transport carriage 28 travels into the treatment installation 78, the joint struts 48, 50 pass into the connecting passage 90 and push the sealing lamellae 106 out of the way in a manner known per se such that a small passage window for tunnel atmosphere is only ever present in the region of the joint struts 48, 50. As a result of the imbricated seal 102, along the entire length of the treatment tunnel 82, the effect of thermal radiation and/or tunnel atmosphere escaping downward into the travel space 92 can be at least reduced. Here too, the shielding means 92 form a sealing device 102.

FIG. 5C shows an exemplary embodiment in which the shielding means 96 act only locally for the region of the drive motors 58.1, 58.2 of the transport carriages 28. To this end, the shielding means 96 comprise two rails 108a, 108b with a C-shaped cross section, which flank the connecting passage 90 on that side of the tunnel floor 88 that faces the travel space 92, such that their open sides face one another. Furthermore, the shielding means 96 comprise, at each joint strut 48, 50, a shielding collar 110, which is formed in a complementary manner to the rails 108a, 108b. The shielding collars 110 are arranged above the drive motors 58.1, 58.2 and largely cover the latter, such that the drive motors 58.1, 58.2 are protected at least from thermal radiation and/or tunnel atmosphere from the treatment tunnel 82. Upon traveling into the treatment installation 78, the shielding collars 110 at the joint struts 48, 50 are guided into the rails 108a, 108b, such that a type of labyrinth seal is formed at the regions in which the shielding collars 110 engage in the rails 108a, 108b.

When the route in a treatment installation 78 is designed only for straight-ahead travel, the shielding collars 110 can be formed in a longer manner in a longitudinal direction of the treatment tunnel 82 than transversely thereto. If traveling through curves in the treatment installation 78 is considered, the shielding collars 110 are in the form of circular disks.

FIG. 5D shows a further exemplary embodiment, in which the shielding means 96 act only locally for the region of the drive motors 58.1, 58.2 of the transport carriages 28. To this end, the shielding means 96 comprise two contact strips 112a, 112b, which flank the connecting passage 90 on that side of the tunnel floor 88 that faces the travel space 92. Furthermore, the shielding means 96 comprise, at each joint strut 48, 50, a contact collar 114, which is formed in a complementary manner to the contact strips 112a, 112b and can press against the latter from beneath when the transport-carriage chassis 38 is located in the travel space 92. The contact collars 114 are arranged above the drive motors 58.1, 58.2 and largely cover the latter, such that the drive motors 58.1, 58.2 are protected at least from thermal radiation and/or tunnel atmosphere from the treatment tunnel 82.

By contrast, FIG. 5E shows again an exemplary embodiment in which the shielding means 96 form a sealing device 102 which can at least reduce, along the entire length of the treatment tunnel 82, the effect of thermal radiation and/or tunnel atmosphere escaping downward into the travel space 92. There, on that side of the tunnel floor 88 that faces the treatment tunnel 82, nozzles 116a, 116b are arranged, which flank the connecting passage 90 on both sides. There are in each case a multiplicity of nozzles 116a and 116b, which are arranged at regular spacings along the connecting passage 90. Through the nozzles 116a, 116b, a separating fluid, for example air or an inert gas, is blown from a fluid source (not shown separately) into the treatment tunnel 82 above the connecting passage 90, with the result that a type of air seal is formed at the connecting passage 90. The outlet openings of the nozzles 116*a*, 116*b* are in this case oriented such that the separating fluid is blown with a flow component upward into the treatment tunnel 82. In modifications that are not shown separately, the outlet openings can also be oriented in some other way. For example, there may be more favorable flow conditions at the connecting passage 90 when the opposite outlet openings of the nozzles 116*a*, 116*b* are oriented horizontally.

FIG. 5F shows a further exemplary embodiment, in which the shielding means 96 form a sealing device 102 which acts along the entire length of the treatment tunnel 82. There, brushes 118*a*, 118*b* and 120*a*, 120*b*, respectively, are arranged on the tunnel floor 88 both on the side facing the treatment tunnel 82 and on the side facing the travel space 92, said brushes facing one another at the connecting passage 90 and covering the connecting passage 90. The brushes 118*a*, 118*b*, 120*a*, 120*b* engage around the connecting device 46 of the transport carriage 28, i.e. in the present case the joint struts 58, 50, when the transport carriage 28 passes through the treatment installation 78.

As mentioned above, the treatment installations 20.*i-j* are configured in design terms like the treatment installation 78, such that the connecting device 46 of the transport carriages 28 can interact with the tunnel floor 88 and the shielding means 96 located there. The devices necessary for each particular treatment are present independently thereof in the respective treatment installations 20.*i-j*. They are for example application, coating and/or handling robots in the application devices of the application zones or associated lighting devices in the auditing/polishing devices, and also the technology necessary for operating the treatment installations 20.*i-j*, for example in the form of the technology for the air supply in coating booths.

What is claimed is:

1. A method for producing vehicles comprising:
  conveying vehicle bodies through a plurality of facility zones of a production facility for producing vehicles, wherein different types of work are carried out on the vehicle bodies in two facility zones which follow one another, wherein
  the vehicle bodies are conveyed through facility zones of a surface treatment facility for the surface treatment of the vehicle bodies, at least from an anticorrosion treatment to a final assembly in the surface treatment facility, with a single conveying system, wherein the single conveying system comprises a multiplicity of transport carriages which are displaceable in a transporting direction on a rail system, wherein each transport carriage comprises a transport-carriage chassis and a fastening device for at least one vehicle body, the transport-carriage chassis and the fastening device being coupled together by a connecting device, and
  the vehicle bodies are treated in at least one facility zone in at least one treatment installation which comprises a housing in which a treatment tunnel having a tunnel floor is accommodated, wherein the tunnel floor has a connecting passage and there is a travel space, arranged beneath the treatment tunnel, for the transport-carriage chassis, such that the transport-carriage chassis is movable in the travel space, wherein the fastening device is carried along in the treatment tunnel and the connecting device extends through the connecting passage.

2. The method as claimed in claim 1, wherein the vehicle bodies are conveyed in an anticorrosion facility with the single conveying system as in the surface treatment facility.

3. The method as claimed in claim 1, wherein the vehicle bodies are conveyed in a bodyshell facility with the single conveying system as in the surface treatment facility.

4. The method as claimed in claim 1, wherein the vehicle bodies are conveyed in an assembly facility with the single conveying system as in the surface treatment facility.

5. A method for producing vehicles comprising:
  conveying vehicle bodies through a plurality of facility zones of a production facility for producing vehicles, wherein different types of work are carried out on the vehicle bodies in two facility zones which follow one another,
  wherein
  the vehicle bodies are conveyed through facility zones of a surface treatment facility for the surface treatment of the vehicle bodies, at least from an anticorrosion treatment to a final assembly in the surface treatment facility, with a single conveying system, wherein the single conveying system comprises a multiplicity of transport carriages which are displaceable in a transporting direction on a rail system, wherein each transport carriage comprises a transport-carriage chassis and a fastening device for at least one vehicle body, the transport-carriage chassis and the fastening device being coupled together by a connecting device, and
  wherein the multiplicity of transport carriages each carry along their own drive system and are driven and displaced independently of one another.

6. The method as claimed in claim 5, wherein the vehicle bodies are conveyed in an assembly facility with the single conveying system as in the surface treatment facility.

\* \* \* \* \*